United States Patent
Gao

(10) Patent No.: US 11,546,749 B2
(45) Date of Patent: Jan. 3, 2023

(54) METHOD AND DEVICE FOR COMMUNICATION PROCESSING, AND STORAGE MEDIUM

(71) Applicant: Beijing Xiaomi Mobile Software Co., Ltd., Beijing (CN)

(72) Inventor: Yi Gao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 113 days.

(21) Appl. No.: 17/099,104

(22) Filed: Nov. 16, 2020

(65) Prior Publication Data
US 2021/0368328 A1 Nov. 25, 2021

(30) Foreign Application Priority Data
May 21, 2020 (CN) .......................... 202010433806.5

(51) Int. Cl.
*H04W 8/18* (2009.01)
*H04W 8/24* (2009.01)
(Continued)

(52) U.S. Cl.
CPC ............ *H04W 8/183* (2013.01); *H04W 8/245* (2013.01); *H04W 24/10* (2013.01); *H04W 60/005* (2013.01)

(58) Field of Classification Search
CPC ..... H04W 8/183; H04W 8/245; H04W 24/10; H04W 60/005; H04W 76/15;
(Continued)

(56) References Cited

U.S. PATENT DOCUMENTS

| 2018/0124868 A1 | 5/2018 | Gupta et al. |
| 2020/0015303 A1 | 1/2020 | Tsai et al. |

(Continued)

FOREIGN PATENT DOCUMENTS

| CN | 106028368 A | 10/2016 |
| CN | 110149732 A | 8/2019 |
| WO | WO 2020/045952 A1 | 3/2020 |

OTHER PUBLICATIONS

Vivo, China Telecom, CAICT, Xiaomi, CMCC, Charter Communications, China Unicom, Samsung; Considerations on multi-SIM study in RAN, 3GPP TSG RAN Meeting #84, RP-191304, Newport Beach, USA, Jun. 3-6, 2019, 7 pages.
(Continued)

*Primary Examiner* — Chuong A Ngo
(74) *Attorney, Agent, or Firm* — Finnegan, Henderson, Farabow, Garrett & Dunner, L.L.P.

(57) ABSTRACT

A method for communication processing, applied to a terminal device having installed therein multiple subscriber identity module (SIM) cards including a data primary card and a data secondary card each supporting a New Radio (NR) communication function, includes: conducting statistics on cell information of cells supporting the NR communication function; and determining, according to the cell information, whether a cell to which the data secondary card is registered is a cell supporting the NR communication function, and in response to the cell to which the data secondary card is registered being the cell supporting the NR communication function, enabling the NR communication function of the data secondary card and controlling the data secondary card to perform cell measurement.

20 Claims, 6 Drawing Sheets

(51) Int. Cl.
*H04W 24/10* (2009.01)
*H04W 60/00* (2009.01)

(58) Field of Classification Search
CPC ......... H04W 36/0011; H04W 36/0083; H04W 52/0212; H04W 56/001; H04W 88/06
See application file for complete search history.

(56) References Cited

U.S. PATENT DOCUMENTS

| | | |
|---|---|---|
| 2021/0022209 A1 | 1/2021 | Singh et al. |
| 2022/0095211 A1* | 3/2022 | Nagaraju ............... H04W 48/18 |
| 2022/0095245 A1* | 3/2022 | Wang ................. H04W 52/265 |

OTHER PUBLICATIONS

China Telecom; Views on NR Rel-17, 3GPP TSG RAN Meeting #84, RP-191449, Newport Beach, USA, Jun. 3-6, 2019, 16 pages.
First Office Action of Chinese Application No. 202010433806.5, dated Jul. 2, 2020.
EventHelix: "5G Standalone Access Registration", Nov. 17, 2018, XP055819546, Retrieved from the Internet:URL:https://medium.com/5g-nr/5g-standalone-access-registration-fe80aa28d723 [retrieved on Jun. 30, 2021], 13 pages.
Erik Westerberg: "4G/5G Ran Architecture: How a Split Can Make the Difference", Ericsson Technology Review, Jul. 22, 2016, XP055478880, Retrieved from the Internet:URL:https://www.ericsson.com/assets/local/publications/ericsson-technology-review/docs/2016/etr-ran-architecture.pdf [retrieved on May 28, 2018], 16 pages.
European Search Report in European Application No. 21151849.3, dated Jul. 12, 2021.

\* cited by examiner

METHOD AND DEVICE FOR COMMUNICATION PROCESSING, AND STORAGE MEDIUM

CROSS-REFERENCE TO RELATED APPLICATIONS

This application is based upon and claims priority to Chinese Patent Application No. 202010433806.5, filed on May 21, 2020, the entire contents of which are hereby incorporated by reference.

TECHNICAL FIELD

The present disclosure generally relates to the field of communication technology, and more particularly, to a method and device for communication processing, and a storage medium.

BACKGROUND

Along with the development of communication technology, the development of the fifth generation (5G) new radio (NR) communication technology has been in the drive to maturity stage. 5G NR communication is sometimes abbreviated as 5G communication or NR communication.

In the related art, a terminal device supports communication based on a single subscriber identity module (SIM) card, and also supports communication based on multiple SIM cards. 5G communication based on a single SIM card has been in the drive to maturity stage, and will soon begin to lead the 5G communication based on multiple SIM cards. 5G communication based on multiple SIM cards can be understood as multiple SIM cards having their 5G communication functions enabled. In 5G communication based on multiple SIM cards, it is usually configured with a data primary card and a data secondary card, and only the data primary card can be actually connected to the 5G network, whereas typically the data secondary card can be merely connected to a cell having 5G anchor points, and will not be actually connected to the 5G network.

In the process of 5G communication based on multiple SIM cards, through the enabling of the 5G communication functions of multiple SIM cards, the data primary card that is actually connected to the 5G network can be switched among the multiple SIM cards, which may cause problems regarding power consumption.

SUMMARY

According to a first aspect of embodiments of the disclosure, there is provided a method for communication processing, which is applied to a terminal device having installed therein multiple SIM cards including a data primary card and a data secondary card each supporting an NR communication function, the method including: conducting statistics on cell information of cells supporting the NR communication function; and determining, according to the cell information, whether a cell to which the data secondary card is registered is a cell supporting the NR communication function, and in response to the cell to which the data secondary card is registered being the cell supporting the NR communication function, enabling the NR communication function of the data secondary card and controlling the data secondary card to perform cell measurement.

According to a second aspect of embodiments of the disclosure, there is provided a device for communication processing, the device being configured for installation with multiple SIM cards including a data primary card and a data secondary card each supporting an NR communication function, and the device including: a processor; and a memory for storing instructions executable by the processor, wherein the processor is configured to: conduct statistics on cell information of cells supporting the NR communication function; and determine, according to the cell information, whether a cell to which the data secondary card is registered is a cell supporting the NR communication function, and in response to the cell to which the data secondary card is registered being the cell supporting the NR communication function, enable the NR communication function of the data secondary card and controlling the data secondary card to perform cell measurement.

According to a third aspect of embodiments of the disclosure, there is provided a non-transitory computer-readable storage medium having stored therein instructions that, when executed by a processor of a terminal device, cause the terminal device to perform a method for communication processing, the terminal device having installed therein multiple subscriber identity module (SIM) cards comprising a data primary card and a data secondary card each supporting an NR communication function, the method including: conducting statistics on cell information of cells supporting the NR communication function; and determining, according to the cell information, whether a cell to which the data secondary card is registered is a cell supporting the NR communication function, and in response to the cell to which the data secondary card is registered being the cell supporting the NR communication function, enabling the NR communication function of the data secondary card and controlling the data secondary card to perform cell measurement.

It should be understood that the general description above and detailed description below are merely exemplary and explanatory, and do not restrict the disclosure.

BRIEF DESCRIPTION OF THE DRAWINGS

The accompanying drawings are incorporated into the specification and constitute part of the specification, illustrate embodiments consistent with the disclosure, and explain the principles of the disclosure.

DETAILED DESCRIPTION

Detailed description will be made here to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The method for communication processing provided by the embodiments of the present disclosure is applied to a terminal device installed with multiple SIM cards, and the multiple SIM cards installed on the terminal device include a data primary card and a data secondary card each supporting an NR communication function. Each of the data primary card and the data secondary card supports the NR communication function, which can also be referred to as a dual NR function of the terminal device or a dual 5G communication function of the terminal device. In the following embodiments of the present disclosure, NR and 5G may be used interchangeably, and those skilled in the art should understand their meaning.

In the related art, when the terminal device enables the dual 5G communication function, the data primary card is connected to the 5G network for 5G communication, and the data secondary card is not actually connected to the 5G network, but performs real-time cell measurement. The real-time cell measurement performed by the data secondary card may cause problems regarding power consumption.

In view of this, the embodiments of the present disclosure provide a method for communication processing. In the method for communication processing, in response to that the cell to which the data secondary card is registered is a cell supporting the 5G communication function (hereinafter referred to as a 5G cell), the 5G communication function of the data secondary card is enabled, and the data secondary card is controlled to perform cell measurement. As a result, the dual 5G communication function may not be affected and power consumption may be reduced.

Figure 1:
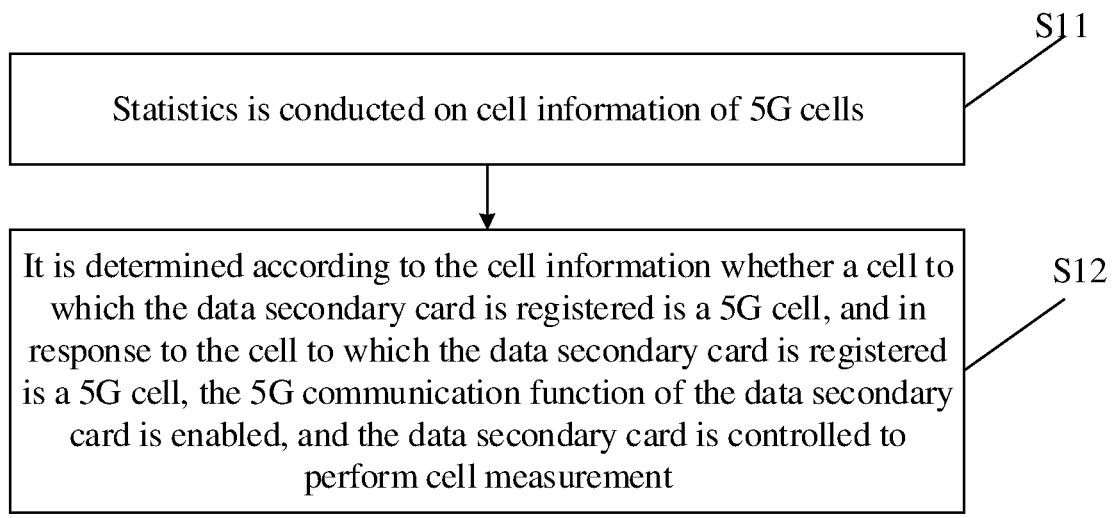
FIG. 1 is a flowchart of a method for communication processing according to an exemplary embodiment.

FIG. 1 is a flowchart of a method for communication processing according to an exemplary embodiment. As shown in FIG. 1, the method for communication processing is applied to a terminal device and includes the following operations.

In operation S11, statistics is conducted on cell information of 5G cells.

In operation S12, it is determined according to the cell information whether a cell to which the data secondary card is registered is a 5G cell, and in response to the cell to which the data secondary card is registered is a 5G cell, a 5G communication function of the data secondary card is enabled, and the data secondary card is controlled to perform cell measurement.

In the embodiment, in response to that the cell to which the data secondary card is registered is a cell supporting the 5G communication function (hereinafter referred to as a 5G cell), the 5G communication function of the data secondary card is enabled, and the data secondary card is controlled to perform cell measurement. As a result, the dual 5G communication function may not be affected and power consumption may be reduced.

In an embodiment, the terminal device monitors the cells to which multiple SIM cards installed on the terminal device are registered. For example, the terminal device can invoke an operating system interface of the terminal device to monitor, in real-time, cell information of the cells to which all SIM cards inserted in the terminal device are registered, and record the cell information of the monitored cells in real-time.

In an embodiment, in response to that the cells to which the multiple SIM cards are registered include a Standalone (SA) 5G cell (the terminal device is connected to the SA 5G cell), statistics is conducted on the cell information of the SA 5G cell and the resulting cell information is recorded. In another embodiment, in response to that the cells to which the multiple SIM cards are registered include a Non-Standalone (NSA) 5G cell (the terminal device is connected to the NSA 5G cell), statistics is conducted on the cell information of the NSA 5G cell and the resulting cell information is recorded. In yet another embodiment, in response to that the cells to which the multiple SIM cards are registered include an NSA LTE cell and the NSA LTE cell includes an NR anchor point, statistics is conducted on the cell information of the NSA LTE cell and the resulting cell information is recorded. The LTE cell is sometimes referred to as a 4G cell. That is, in response to that the terminal device is connected to an NSA 4G cell, statistics is conducted on cell information of the 4G cell and the resulting cell information is recorded. The 4G cell has a 5G anchor point, which can provide the terminal device with a EUTRA-NR Dual Connection (EN-DC) function.

For example, Table 1 below shows recorded cell information.

TABLE 1

| SIM card | Cell information |
| --- | --- |
| data primary card (data card) | e.g., cell information of a 5G cell |
| data secondary card (non-data card) | e.g., cell information of an NSA 4G cell |

The cell information in Table 1 includes cell information of a 5G cell to which the data primary card as a data card is registered, and cell information of an NSA 4G cell to which the data secondary card as a non-data card is registered.

In an embodiment, after obtaining the cell information, the terminal device can record and keep the cell information locally. Further, the terminal device can synchronize the recorded cell information to a server. For example, in a case that the terminal device is connected to the Internet, the recorded cell information may be synchronized and uploaded to the server on a regular basis (such as on a daily basis).

The cell information of the cells supporting the 5G communication function can also be obtained from the server. For example, the terminal device may periodically obtain the cell information of the cells supporting the 5G communication function from the server. In an embodiment, in addition to recording cell information of the cells that the current terminal device has accessed, the terminal device may also need to periodically download from the server the cell information saved in the server. The cell information of the cells supporting the 5G communication function, which is obtained from the server, may include at least one of: cell information, uploaded by the terminal device, of cells to which the multiple SIM cards are registered; cell information synchronized by operation personnel; or cell information obtained from an operator or cell information saved in the server through other channels.

In the embodiment, the terminal device conducts statistics and records the cell information of the 5G cell, and obtains the cell information of the cell to which the data secondary card is registered. The cell information of the cell to which the data secondary card is registered is compared with the recorded cell information of the 5G cell to determine whether the cell to which the data secondary card is registered is a cell supporting the 5G communication function, for example, whether the cell is a 5G or 4G cell for SA or NSA.

If the cell to which the data secondary card is registered is a cell supporting the 5G communication function, it is determined to enable the 5G communication function of the data secondary card, and the data secondary card is controlled to perform cell measurement. In an embodiment, the 5G communication function of the data secondary card can be enabled by invoking the system interface.

If the cell to which the data secondary card is registered is not a cell supporting the 5G communication function, the 5G communication function of the data secondary card is not enabled, and the data secondary card does not perform cell measurement, so that power consumption is reduced. Further, if the cell to which the data secondary card is registered is not a cell supporting the 5G communication function, no processing is performed temporarily, and in response to that the data secondary card is subsequently switched to a new cell, it is re-determined whether the cell to which the data secondary card is registered is a cell supporting the 5G communication function.

In an embodiment, in response to that the terminal device monitors that the cell to which the SIM card is registered is switched, the terminal device can start conducting statistics on the cell information.

In an embodiment, a switch setting unit for enabling or disabling the dual 5G communication function can be set, and the dual 5G communication function can be enabled or disabled through the switch setting unit. The enabling of the dual 5G communication function indicates that the data primary card has the 5G communication function enabled, and the secondary data card has the 5G communication function enabled. The disabling of the dual 5G communication function indicates that at least one of the data primary card and the data secondary card has not its 5G communication function enabled.

Figure 2:
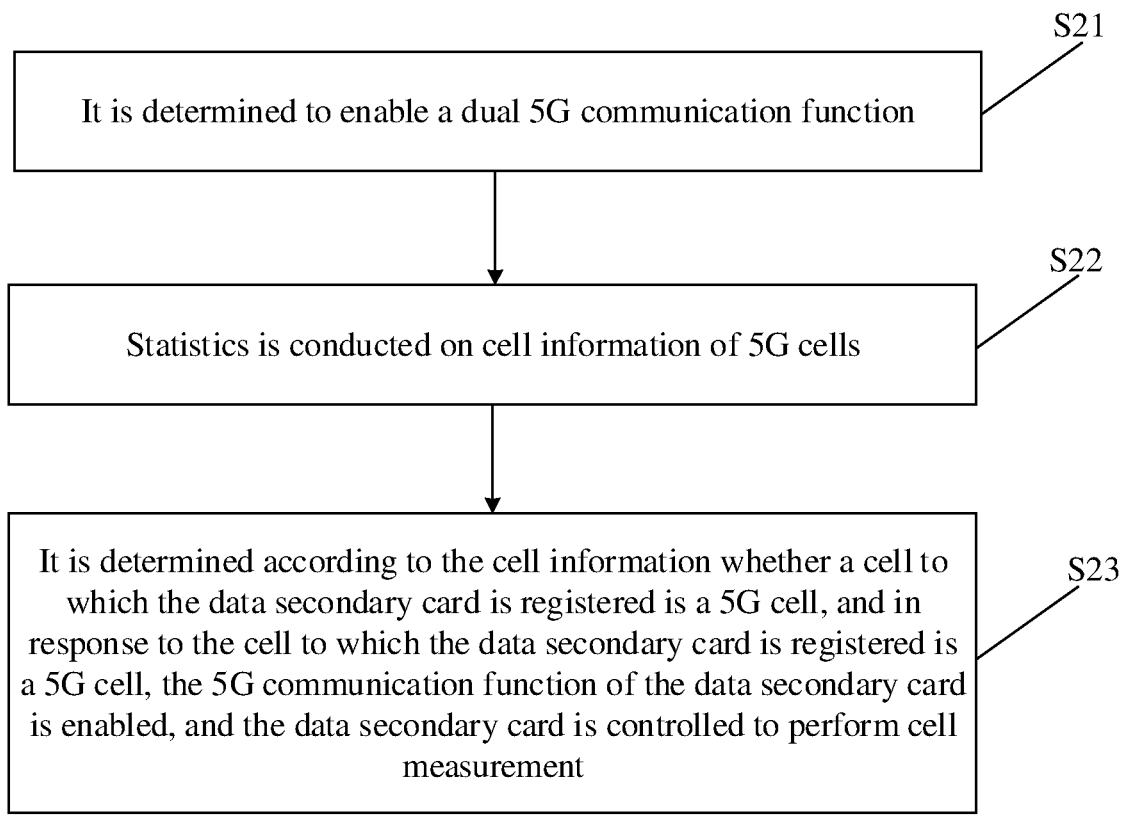
FIG. 2 is a flowchart of a method for communication processing according to an exemplary embodiment.

FIG. 2 is a flowchart of a method for communication processing according to an exemplary embodiment. As shown in FIG. 2, the method for communication processing is applied to a terminal device and includes the following operations.

In operation S21, it is determined to enable the dual 5G communication function.

In an embodiment, a dual 5G communication function switch is provided. In response to that the dual 5G communication function switch is turned on, the terminal device determines that the dual 5G communication function is enabled. In response to that the dual 5G communication function switch is turned off, the terminal device determines that the dual 5G communication function is disabled. In the embodiment, in response to that a trigger operation for turning on the dual NR function switch is received, it is determined to enable the dual NR function.

In another embodiment, the terminal device may provide a network mode selection list interface for the data secondary card (non-data card). Selection of the 5G network mode by a user in the network mode selection list interface for the data secondary card indicates that the dual 5G communication function is enabled. Cancellation of the selection of the 5G network mode of the data secondary card by the user (that is, selection of the non-5G network mode) indicates that the dual 5G communication function is disabled. In the embodiment, in response to that a selection instruction for enabling the 5G communication mode in the network mode selection list interface for the data secondary card is received, it is determined to enable the dual 5G communication function.

In operation S22, statistics is conducted on cell information of 5G cells, similar to operation S11 (FIG. 1).

In operation S23, it is determined according to the cell information whether a cell to which the data secondary card is registered is a 5G cell, and in response to the cell to which the data secondary card is registered is a 5G cell, a 5G communication function of the data secondary card is enabled, and the data secondary card is controlled to perform cell measurement, similar to operation S12 (FIG. 1).

According to the method for communication processing provided by the embodiments of the present disclosure, 5G measurement by the data secondary card is not initiated in real-time for a terminal device that performs the dual 5G communication function. Only in response to that the cell to which the data secondary card is registered meets the conditions for 5G cells on which statistics have been conducted, the cell measurement is initiated and the data secondary card is connected to the 5G network. As a result, the dual 5G communication function may not be affected, and power consumption may be reduced.

Embodiments of the present disclosure also provide a device for communication processing. The device for communication processing may include one or more units and each unit can be implemented in hardware, or software, or a combination of hardware and software. Whether a certain function is implemented by hardware or by software may depend on the specific application and design constraint conditions. Those skilled in the art can use different methods for each specific application to implement the described units.

Figure 3:
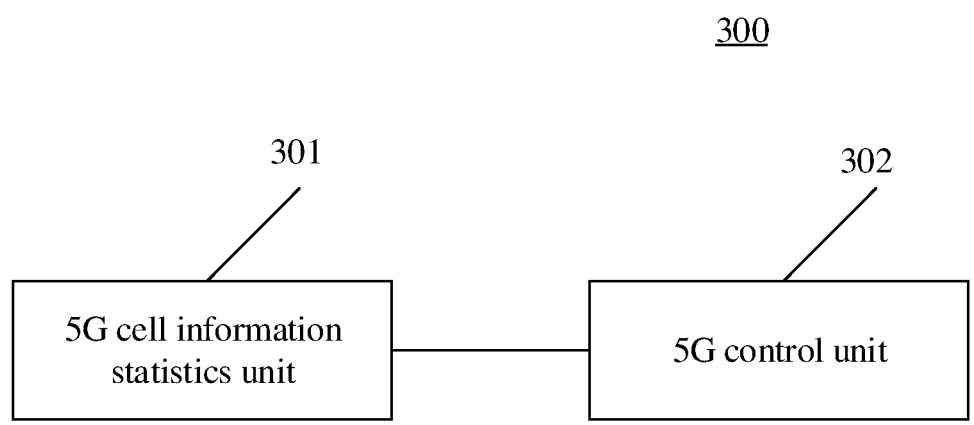
FIG. 3 is a block diagram of a device for communication processing according to an exemplary embodiment.

FIG. 3 is a block diagram of a device 300 for communication processing according to an exemplary embodiment. Referring to FIG. 3, the device 300 for communication processing is applied to a terminal device having installed thereon multiple SIM cards, which include a data primary card and a data secondary card each supporting the 5G communication function. The device 300 for communication processing includes a 5G cell information statistics unit 301 and a 5G control unit 302.

The 5G cell information statistics unit 301 is configured to conduct statistics on cell information of cells supporting the 5G communication function. The 5G control unit 302 is configured to determine, based on the cell information, whether a cell to which the data secondary card is registered is a cell supporting the 5G communication function, and in response to that the cell to which the data secondary card is registered is a cell supporting the 5G communication function, enable the 5G communication function of the data secondary card, and control the data secondary card to perform cell measurement.

Figure 4:
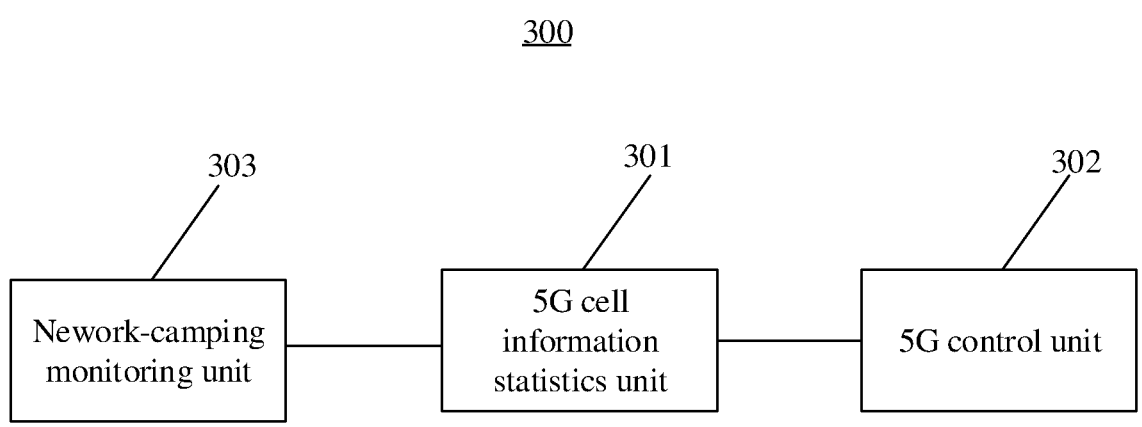
FIG. 4 is a block diagram of a device for communication processing according to an exemplary embodiment.

FIG. 4 is a block diagram of the device 300 for communication processing according to an exemplary embodiment. Referring to FIG. 4, the device 300 for communication processing further includes a network-camping monitoring unit 303 configured to monitor cells to which the multiple SIM cards are registered.

In an embodiment, in response to that the network-camping monitoring unit 303 monitors that the cells to which the multiple SIM cards are registered include an SA 5G cell, the 5G cell information statistics unit 301 conducts statistics on and records cell information of the SA 5G cell.

In an embodiment, in response to that the network-camping monitoring unit 303 monitors that the cells to which the multiple SIM cards are registered include an NSA 5G cell, the 5G cell information statistics unit 301 conducts statistics on and records cell information of the NSA 5G cell.

In an embodiment, in response to that the network-camping monitoring unit 303 monitors that the cells to which the multiple SIM cards are registered include an NSA LTE cell and the NSA LTE cell includes a 5G anchor point, the 5G cell information statistics unit 301 conducts statistics on and records the NSA LTE cell.

In an embodiment, the 5G cell information statistics unit 301 periodically obtains the cell information of the cells supporting the 5G communication function from the server.

In an embodiment, the cell information of the cells supporting the 5G communication function, which is obtained from the server, includes at least one of: cell information, uploaded by the terminal device, of cells to which the multiple SIM cards are registered; cell information synchronized by operation personnel; or cell information obtained from an operator.

In another embodiment, the 5G cell information statistics unit 301 is further configured to synchronize the cell information of the cells to which the multiple SIM cards are registered to the server.

Figure 5:
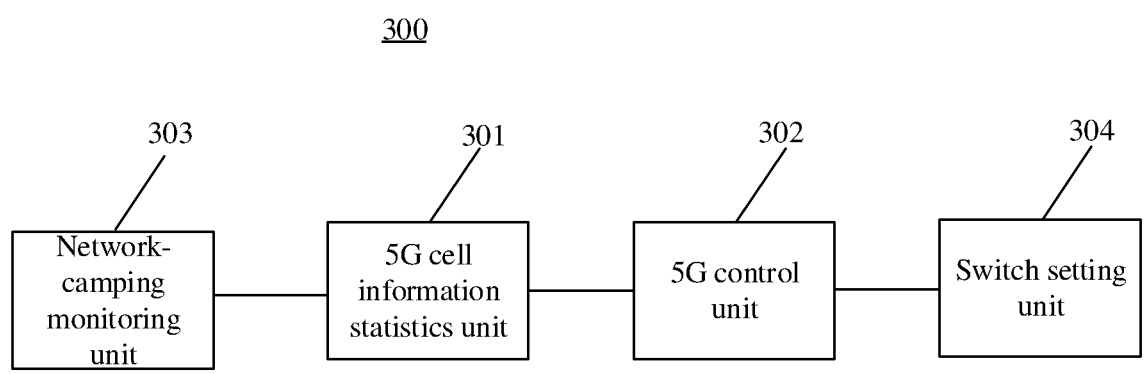
FIG. 5 is a block diagram of a device for communication processing according to an exemplary embodiment.

FIG. 5 is a block diagram of the device 300 for communication processing according to an exemplary embodiment. Referring to FIG. 5, the device 300 for communication processing further includes a switch setting unit 304 configured to enable or disable the dual 5G communication function. The enabling of the dual 5G communication function indicates that the data primary card has the 5G communication function enabled, and the data secondary card has the 5G communication function enabled. The 5G control unit 302 is further configured to determine to enable the dual 5G communication function.

In an embodiment, in response to that the switch setting unit 304 receives a trigger operation for turning on the dual 5G communication function switch, the 5G control unit 302 determines that the dual 5G communication function is enabled. In an embodiment, in response to that the switch setting unit 304 receives a selection instruction for enabling a 5G communication mode in a network mode selection list interface for the data secondary card, the 5G control unit 302 determines to enable the dual 5G communication function.

In the embodiment, the switch setting unit 304 provides control setting options for the dual 5G communication function, and the user can enable or disable the dual 5G communication function at any time. The switch setting unit 304 may provide different interface displays to control the enabling or disabling of the dual 5G communication function.

The switch setting unit 304 can control the enabling or disabling of the dual 5G communication function in first and second manners.

In the first manner, the dual 5G communication function switch is provided. In response to that the user turns on the dual 5G communication function switch, the dual 5G communication function is enabled. In response to that the user turns off the dual 5G communication function switch, the dual 5G communication function is disabled.

In the second manner, the network mode selection list interface for the data secondary card (non-data card) is provided, such as a 5G network mode selection interface. Selection of the 5G network mode by a user in the network mode selection list interface for the data secondary card indicates that the dual 5G communication function is enabled. Cancellation of the selection of the 5G network mode of the data secondary card by the user (that is, selection of any other network mode) indicates that the dual 5G communication function is disabled.

In an embodiment, after the user enables the dual 5G communication function through the switch setting unit 304, the data secondary card does not actually initiate 5G registration with the 5G network at this time, and only after the subsequent confirmation that the cell to which the data secondary card is registered supports 5G communication, the 5G registration will be initiated.

In an embodiment, the network-camping monitoring unit 303 invokes an operating system interface of the terminal device to monitor, in real time, the network information of the cells to which all SIM cards inserted in the terminal device are registered, and record the network information in real-time. In response to that the network-camping monitoring unit 303 monitors the cell being registered is switched, the current cell information is sent to the 5G cell information statistics unit 301.

In the embodiment, the 5G cell information statistics unit 301 may need to conduct statistics on cell information of 5G cells. For example, in response to that the current terminal device is connected to an SA 5G cell, cell information of the SA 5G cell is recorded. In response to that the current terminal device is connected to an NSA 5G cell, cell information of the NSA 5G cell is recorded. In response to that the current terminal device is connected to an NSA 4G cell, cell information of the NSA 4G cell is recorded. The NSA 4G cell has a 5G anchor point to provide the terminal device with an EN-DC connection.

In an embodiment, after locally recording the cell information, the 5G cell information statistics unit 301 may synchronize and upload the cell information to the server on a regular basis (such as on a daily basis) and in the case of the terminal device is connected to the Internet. In addition to recording the cell information that the terminal device has accessed, the 5G cell information statistics unit 301 may also periodically download cell information uploaded by other terminal devices from the server.

In an embodiment, the cell information stored in the server synchronized by the 5G cell information statistics unit 301 may have multiple sources. For example, it can be: (1) cell information being registered, which is uploaded by a 5G terminal device; (2) cell information manually synchronized by operation personnel; (3) cell information obtained from an operator; and (4) or other channels.

In an embodiment, the 5G control unit 302 may invoke the system to enable or disable the 5G communication function of a certain SIM card. In response to that the 5G communication function of the SIM card is enabled, the SIM card initiates 5G measurement to the network and waits for the network to allocate 5G resources. In response to that the 5G communication function of the SIM card is disabled, the SIM card stops 5G measurement to the network.

In an embodiment, after the user enables the dual 5G communication through the switch setting unit 304, the switch setting unit 304 may notify the 5G control unit 302 that the dual 5G communication function has been enabled. The 5G control unit 302 may determine whether to control the data secondary card to connect to the 5G network by determining whether the cell to which the data secondary card is registered is a cell supporting the 5G radio communication function.

In an embodiment, if the user disables the dual 5G communication function through the switch setting unit 304, the 5G control unit 302 directly invokes the system interface to disable the 5G communication function of the data secondary card.

In an embodiment, the 5G control unit 302 may need to obtain in real time the cell information of the cell to which the current secondary card is registered monitored by the network-camping monitoring unit 303, and send the cell information to the 5G cell information statistics unit 301 by sending a confirmation instruction to determine whether the current cell is a cell supporting the 5G radio communication function (5G or 4G cell for SA or NSA).

In an embodiment, after the 5G cell information statistics unit 301 receives the confirmation instruction sent by the 5G control unit 302, it compares the transmitted cell information with the information saved in the local database. If the cell information is contained in the database, the result of supporting the 5G communication function is returned to the 5G control unit 302; otherwise, the result of not supporting the 5G communication function is returned to the 5G control unit 302. The 5G control unit 302 receives the returned result, and if it is supporting the 5G communication function, it invokes the system interface to enable the 5G communication function of the data secondary card. If it is not supporting the 5G communication function, no processing is performed, and in response to the data secondary card is subsequently switched to a new cell, the process of determining whether to enable 5G communication function is repeated.

With respect to the device in the above embodiments, the specific manners for performing operations by individual units therein have been described in detail in the embodiments of the method, which will not be repeated herein.

Figure 6:
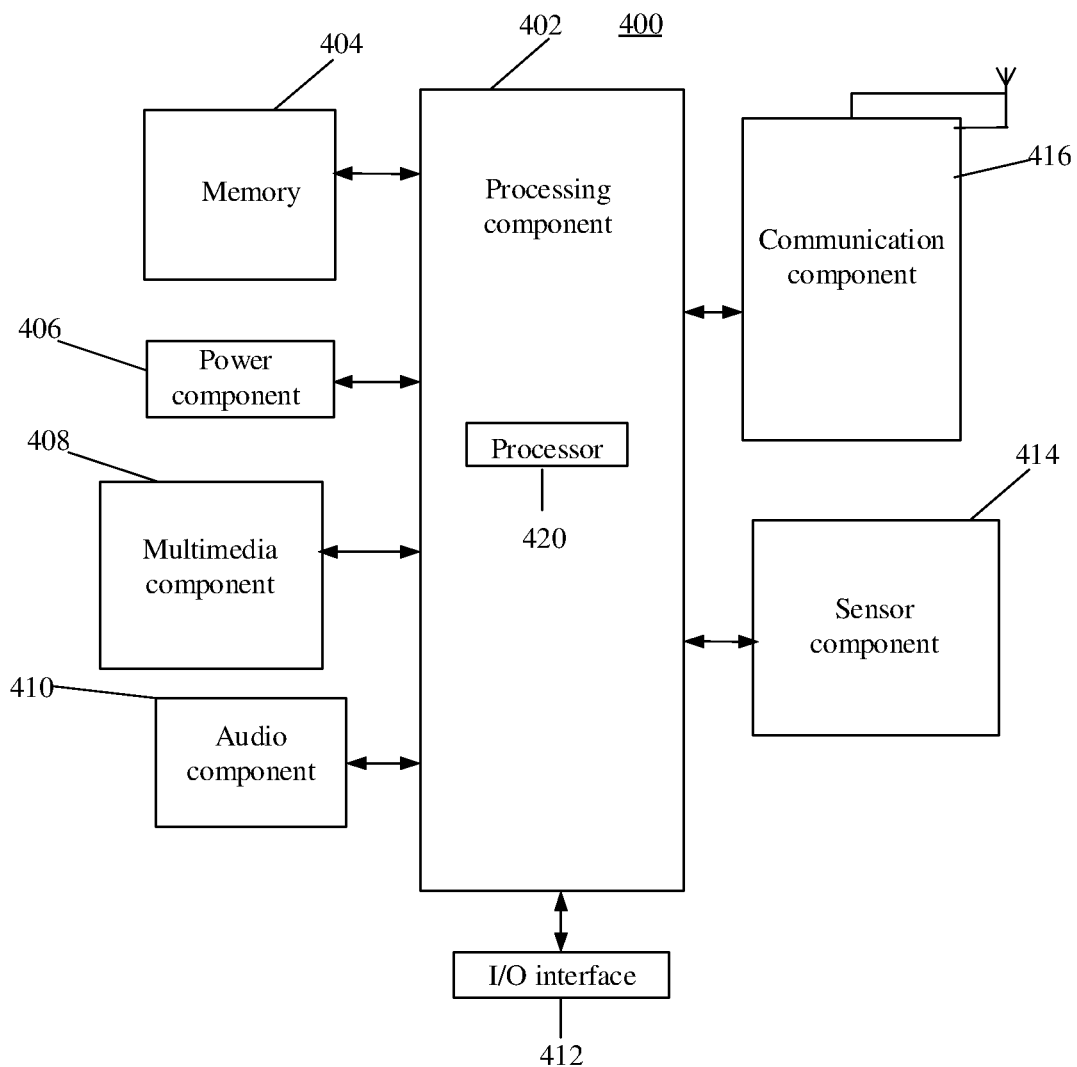
FIG. 6 is a block diagram of a device for communication processing according to an exemplary embodiment.

FIG. 6 is a block diagram of a device 400 for communication processing according to an exemplary embodiment. For example, the device 400 may be a mobile phone, a computer, a digital broadcast terminal, a messaging device, a game console, a tablet, a medical device, exercise equipment, a personal digital assistant, and the like.

Referring to FIG. 6, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls the overall operations of the device 400, such as operations associated with display, telephone calls, data communications, camera operations, and recording operations. The processing component 402 may include one or more processors 420 to execute instructions to perform all or part of the operations of the abovementioned method. Moreover, the processing component 402 may include one or more modules which facilitate the interaction between the processing component 402 and other components. For example, the processing component 402 may include a multimedia module to facilitate the interaction between the multimedia component 408 and the processing component 402.

The memory 404 is configured to store various types of data to support the operation of the device 400. Examples of such data include instructions for any application or method operating on the device 400, contact data, phone book data, messages, pictures, videos, etc. The memory 404 may be implemented using any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker for outputting audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For example, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 4G, or 5G, or a combination thereof. In one exemplary embodiment, the communication component 416 receives a broadcast signal or broadcast associated information from an external broadcast management system via a broadcast channel In one exemplary embodiment, the communication component 416 further includes a near field communication (NFC) module to facilitate short-range communications. In one exemplary embodiment, the communication component 416 may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 404, executable by the processor 420 in the device 400, for performing the above-described methods. For example, the non-transitory computer-readable storage medium may be a ROM, a CD-ROM, a magnetic tape, a floppy disc, an optical data storage device, and the like.

It should be understood that although the operations in the embodiments of the present disclosure are described in a specific order in the drawings, they should not be understood as requiring these operations to be performed in the particular order shown or in sequential order, or requiring all the operations shown to be performed to achieve desirable results. In certain circumstances, multitasking and parallel processing may be advantageous.

Other embodiments of the disclosure will be apparent to those skilled in the art from consideration of the specification and practice of the disclosure. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for communication processing, applied to a terminal device having installed therein multiple subscriber identity module (SIM) cards comprising a data primary card and a data secondary card each supporting a New Radio (NR) communication function, and the data primary card being connected to an NR network for NR communication, the method comprising:
conducting statistics on cell information of cells supporting the NR communication function; and
determining, according to the cell information, whether a cell to which the data secondary card is registered is a cell supporting the NR communication function, and in response to the cell to which the data secondary card is registered being the cell supporting the NR communication function, enabling the NR communication function of the data secondary card and controlling the data secondary card to perform cell measurement.

2. The method of claim 1, further comprising:
monitoring cells to which the multiple SIM cards are registered,
wherein conducting statistics on the cell information of the cells supporting the NR communication function comprises one of:
in response to the cells to which the multiple SIM cards are registered comprising a Standalone (SA) NR cell, conducting statistics on and recording cell information of the SA NR cell;
in response to the cells to which the multiple SIM cards are registered comprising a Non-Standalone (NSA) NR cell, conducting statistics on and recording cell information of the NSA NR cell; or
in response to the cells to which the multiple SIM cards are registered comprising an NSA Long Term Evolution (LTE) cell and the NSA LTE cell comprising an NR anchor point, conducting statistics on and recording cell information of the NSA LTE cell.

3. The method of claim 2, further comprising:
synchronizing, to a server, the cell information of the cells to which the multiple SIM cards are registered.

4. The method of claim 1, wherein conducting statistics on the cell information of the cells supporting the NR communication function comprises:
obtaining, from a server, the cell information of the cells supporting the NR communication function periodically.

5. The method of claim 4, wherein the cell information of the cells supporting the NR communication function, which is obtained from the server, comprises at least one of:
cell information, uploaded by the terminal device, of cells to which the multiple SIM cards are registered;
cell information synchronized by operation personnel; or
cell information obtained from an operator.

6. The method of claim 1, further comprising:
determining to enable a dual NR function, wherein enabling of the dual NR function indicates that the data primary card has the NR communication function enabled and the data secondary card has the NR communication function enabled.

7. The method of claim 6, wherein determining to enable the dual NR function comprises one of:
in response to receiving a trigger operation for turning on a dual NR function switch, determining to enable the dual NR function; or
in response to receiving a selection instruction for enabling an NR communication mode in a network mode selection list interface for the data secondary card, determining to enable the dual NR function.

8. A device for communication processing, the device being configured for installation with multiple subscriber identity module (SIM) cards comprising a data primary card and a data secondary card each supporting a New Radio (NR) communication function, the data primary card being connected to an NR network for NR communication, and the device comprising:
a processor; and
a memory for storing instructions executable by the processor,
wherein the processor is configured to:
conduct statistics on cell information of cells supporting the NR communication function; and
determine, according to the cell information, whether a cell to which the data secondary card is registered is a cell supporting the NR communication function, and in response to the cell to which the data secondary card is registered being the cell supporting the NR communication function, enable the NR communication function of the data secondary card and controlling the data secondary card to perform cell measurement.

9. The device of claim 8, wherein the processor is further configured to:
monitor cells to which the multiple SIM cards are registered,
wherein in conducting statistics on the cell information of the cells supporting the NR communication function, the processor is further configured to perform one of:
in response to the cells to which the multiple SIM cards are registered comprising a Standalone (SA) NR cell, conducting statistics on and recording cell information of the SA NR cell;
in response to the cells to which the multiple SIM cards are registered comprising a Non-Standalone (NSA) NR cell, conducting statistics on and recording cell information of the NSA NR cell; or
in response to the cells to which the multiple SIM cards are registered comprising an NSA Long Term Evolution (LTE) cell and the NSA LTE cell comprising an NR anchor point, conducting statistics on and recording cell information of the NSA LTE cell.

10. The device of claim 9, wherein the processor is further configured to:
synchronize, to a server, the cell information of the cells to which the multiple SIM cards are registered.

11. The device of claim 8, wherein in conducting statistics on the cell information of the cells supporting the NR communication function, the processor is further configured to:
obtain, from a server, the cell information of the cells supporting the NR communication function periodically.

12. The device of claim 11, wherein the cell information of the cells supporting the NR communication function, which is obtained from the server, comprises at least one of:
cell information, uploaded by the terminal device, of cells to which the multiple SIM cards are registered;
cell information synchronized by operation personnel; or
cell information obtained from an operator.

13. The device of claim 8, wherein the processor is further configured to:
determine to enable a dual NR function, wherein enabling of the dual NR function indicates that the data primary card has the NR communication function enabled and the data secondary card has the NR communication function enabled.

14. The device of claim 13, wherein in determining to enable the dual NR function, the processor is further configured to:
in response to receiving a trigger operation for turning on a dual NR function switch, determine to enable the dual NR function; or
in response to receiving a selection instruction for enabling an NR communication mode in a network mode selection list interface for the data secondary card, determine to enable the dual NR function.

15. A non-transitory computer-readable storage medium having stored therein instructions that, when executed by a processor of a terminal device, cause the terminal device to perform a method for communication processing, the terminal device having installed therein multiple subscriber identity module (SIM) cards comprising a data primary card and a data secondary card each supporting a New Radio (NR) communication function, and the data primary card being connected to an NR network for NR communication, the method comprising:
conducting statistics on cell information of cells supporting the NR communication function; and
determining, according to the cell information, whether a cell to which the data secondary card is registered is a cell supporting the NR communication function, and in response to the cell to which the data secondary card is registered being the cell supporting the NR communication function, enabling the NR communication function of the data secondary card and controlling the data secondary card to perform cell measurement.

16. The non-transitory computer-readable storage medium of claim 15, wherein the method further comprises:
monitoring cells to which the multiple SIM cards are registered,
wherein conducting statistics on the cell information of the cells supporting the NR communication function comprises one of:
in response to the cells to which the multiple SIM cards are registered comprising a Standalone (SA) NR cell, conducting statistics on and recording cell information of the SA NR cell;
in response to the cells to which the multiple SIM cards are registered comprising a Non-Standalone (NSA) NR cell, conducting statistics on and recording cell information of the NSA NR cell; or
in response to the cells to which the multiple SIM cards are registered comprising an NSA Long Term Evolution (LTE) cell and the NSA LTE cell comprising an NR anchor point, conducting statistics on and recording cell information of the NSA LTE cell.

17. The non-transitory computer-readable storage medium of claim 16, wherein the method further comprises:
synchronizing, to a server, the cell information of the cells to which the multiple SIM cards are registered.

18. The non-transitory computer-readable storage medium of claim 15, wherein conducting statistics on the cell information of the cells supporting the NR communication function comprises:
obtaining, from a server, the cell information of the cells supporting the NR communication function periodically.

19. The non-transitory computer-readable storage medium of claim 18, wherein the cell information of the cells supporting the NR communication function, which is obtained from the server, comprises at least one of:
cell information, uploaded by the terminal device, of cells to which the multiple SIM cards are registered;
cell information synchronized by operation personnel; or
cell information obtained from an operator.

20. The non-transitory computer-readable storage medium of claim 15, wherein the method further comprises:
determining to enable a dual NR function, wherein enabling of the dual NR function indicates that the data primary card has the NR communication function enabled and the data secondary card has the NR communication function enabled.

* * * * *